United States Patent [19]

Suda

[11] Patent Number: 4,592,637
[45] Date of Patent: Jun. 3, 1986

[54] FOCUS DETECTING DEVICE

[75] Inventor: Shigeyuki Suda, Tokyo, Japan

[73] Assignee: Canon Kabushiki Kaisha, Tokyo, Japan

[21] Appl. No.: 663,074

[22] Filed: Oct. 17, 1984

[30] Foreign Application Priority Data

Oct. 22, 1983 [JP] Japan ................. 58-163716[U]

[51] Int. Cl.$^4$ .............................. G03B 3/00
[52] U.S. Cl. .................... 354/403; 250/201
[58] Field of Search ............. 354/402–409; 356/1; 250/201 AF, 204

[56] References Cited

U.S. PATENT DOCUMENTS

| 4,277,156 | 7/1981 | Fukushima et al. | 354/402 |
| 4,303,319 | 12/1981 | Hell et al. | 354/403 |
| 4,304,487 | 12/1981 | Odone et al. | 354/403 X |
| 4,313,654 | 2/1982 | Matsui | 354/403 |
| 4,458,145 | 7/1984 | Voles | 354/402 X |
| 4,494,868 | 1/1985 | Lambeth | 354/403 X |

FOREIGN PATENT DOCUMENTS 89804  9/1983  European Pat. Off. ............ 354/408

Primary Examiner—William B. Perkey
Attorney, Agent, or Firm—Fitzpatrick, Cella, Harper & Scinto

[57] ABSTRACT

This specification discloses a focus detecting device for detecting the focus state of an objective lens by sensing the light from a light source reflected by an object by means of a sensor provided near a plane conjugate with respect to the predetermined imaging plane of the objective lens, wherein the sensor is inclined with respect to the conjugate plane to thereby increase the energy of the light received by the sensor during non-in-focus.

4 Claims, 16 Drawing Figures

FOCUS DETECTING DEVICE

BACKGROUND OF THE INVENTION

1. Field of the Invention

This invention relates to a focus detecting device for detecting the focus state of an objective lens by sensing the light from a light source reflected by an object by means of a sensor provided near a plane conjugate with respect to the predetermined imaging plane of the objective lens, and particularly to a so-called TTL-active type focus detecting device applicable to a small optical apparatus such as a camera.

2. Description of the Prior Art

Focus detecting devices of this type have already been shown, for example, in U.S. Pat. No. 4,357,085 and Japanese Laid-open Patent Application No. 22210/1982 (laid open on Feb. 5, 1982). In such devices according to the prior art, however, a light-receiving element having the center of its light-receiving surface disposed at a position whereat the image of a light source is formed during the in-focus of the objective lens is disposed along a plane conjugate with the predetermined imaging plane of the objective lens (the object surface) and therefore, the light-receiving efficiency of the light-receiving element during non-in-focus has been low and the detection accuracy in this case has not been sufficient.

FIGS. 1 and 2 of the accompanying drawings show the typical optical system of the TTL-active type focus detecting device. In FIG. 1, a light beam emitted from a light source 1 passes through a projection lens 2, whereafter it is reflected by mirrors 3 and 4 and is projected onto an object, not shown, through an objective lens 5. The light from the light source 1 reflected by the object passes through the objective lens 5, whereafter it is reflected by the mirrors 4 and 3 and is imaged on the light-receiving surface of a light-receiving element 7 through a light-receiving lens 6. In FIG. 2, F designates the image pick-up surface (the predetermined imaging plane) of a camera and, when this device is incorporated into the camera, the light-emitting surface of the light source 1 and the light-receiving surface of the light-receiving element 7 are disposed in a plane conjugate with the surface F. In this case, the light from the light source 1 reflected by the object is converged as shown in FIGS. 3A, 3B and 3C of the accompanying drawings, in accordance with the movement of the objective lens 5 in the direction of the optic axis relative to the object, and forms the image of the light source 1. FIG. 3A shows a case where the objective lens 5 is in its front focus state, FIG. 3B shows a case where the objective lens 5 is in its in-focus state, and FIG. 3C shows a case where the objective lens 5 is in its rear focus state. As is apparent from FIG. 3, the light from the light source 1 reflected by the object has its position of incidence onto the light-receiving element 7 varied in accordance with the focus state of the objective lens 5 and therefore, if the boundary 7C between the first light-receiving area 7A and the second light-receiving area 7B of the light-receiving element 7 is disposed at the converged position of the light during the in-focus of the objective lens 5, detection of the focus state of the objective lens 5 will become possible in accordance with the difference between the outputs of the areas 7A and 7B.

Now, in the device of this type, to avoid the influence of the extraneous light, the light-receiving surface of the light-receiving element 7 is formed in the form of a slit and therefore, the distribution of the reflected light to the light-receiving surface of the light-receiving element 7 in each focus state of the objective lens 5 is such as shown in FIG. 4A of the accompanying drawings. That is, in FIG. 4A, S1 indicates the distribution of the reflected light relative to the light-receiving surface when the objective lens 5 is in its rear focus state, S2 indicates the distribution of the reflected light relative to the light-receiving surface when the objective lens 5 is in its in-focus state, and S3 indicates the distribution of the reflected light relative to the light-receiving surface when the objective lens 5 is in its front focus state. As is apparent from FIG. 4A, during non-in-focus, the distribution of the reflected light is large as indicated by S1 or S3 and most of the reflected light deviates from the light-receiving surface of the light-receiving element 7 and therefore, the light-receiving efficiency of the light-receiving element 7 is remarkably reduced.

Accordingly, in such device according to the prior art, the signal (a−b) indicative of the difference between the outputs of the areas 7A and 7B and the signal (a+b) indicative of the sum of the outputs of the areas 7A and 7B are such as shown in FIGS. 5A and 5B, respectively, of the accompanying drawings, and the output during non-in-focus is low and the detectable distance is limited. In FIGS. 5A and 5B, X indicates the amount of movement of the objective lens 5 and J indicates the in-focus position.

SUMMARY OF THE INVENTION

It is an object of the present invention to provide a focus detecting device of the active type having high focus detecting capability.

Other objects of the present invention will become apparent from the following detailed description of an embodiment thereof taken in conjunction with the accompanying drawings.

DESCRIPTION OF THE PREFERRED EMBODIMENT

Figure 1:
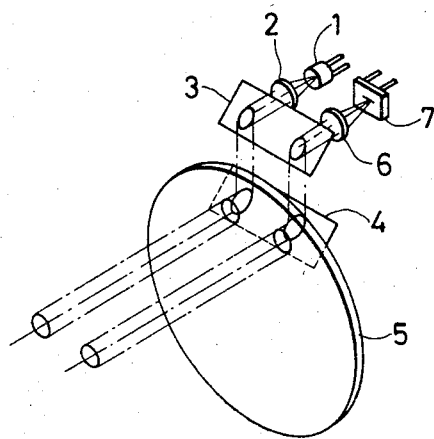
FIG. 1 shows an example of the TTL-active type focus detecting device.
Figure 2:
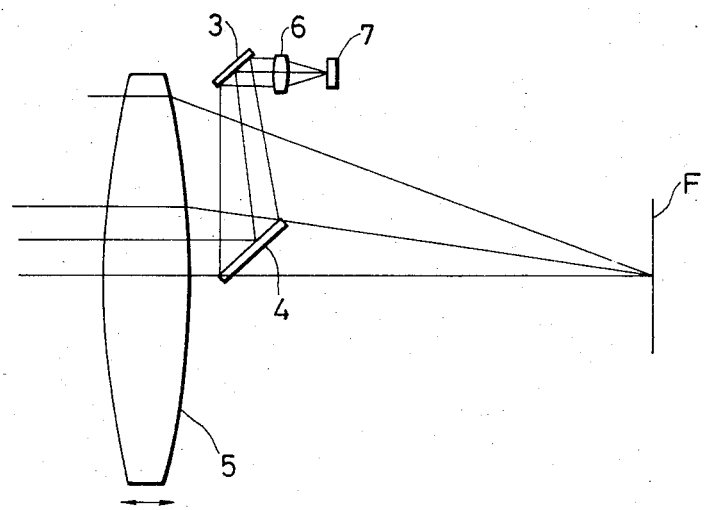
FIG. 2 shows the light-receiving optical system of the device of FIG. 1.
Figure 3A:
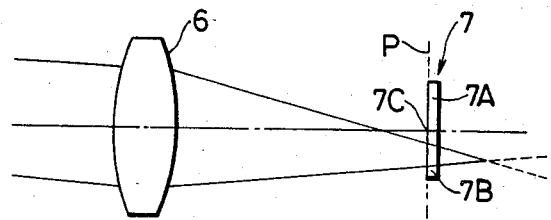
FIGS. 3A, 3B and 3C show the relations between the reflected light from an object and the light-receiving element in an example of the prior art.
Figure 3B:
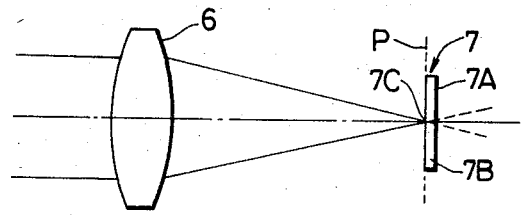
Figure 3C:
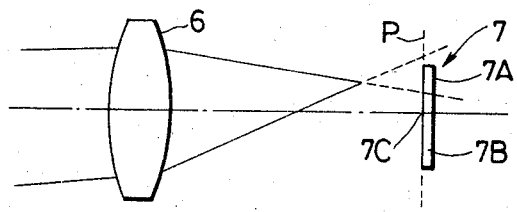
Figure 4A:
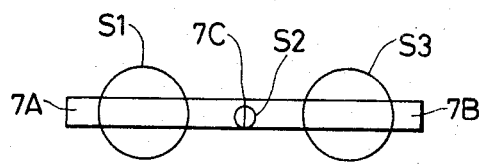
FIGS. 4A and 4B show the distribution and intensity of the reflected light in the example of the prior art.
Figure 4B:
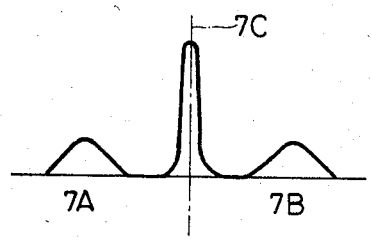
Figure 5A:
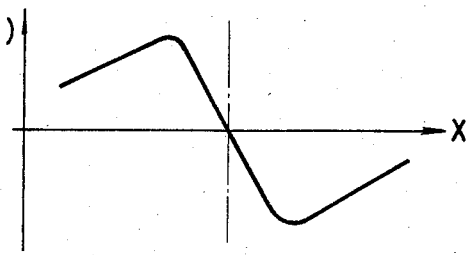
FIGS. 5A and 5B show the waveforms of the difference signal and the sum signal based on the output of the light-receiving element in the example of the prior art.
Figure 5B:
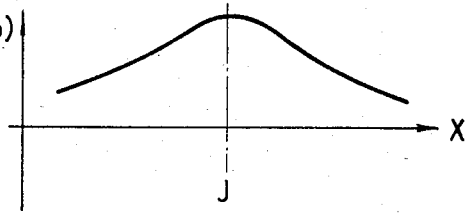
Figure 6A:
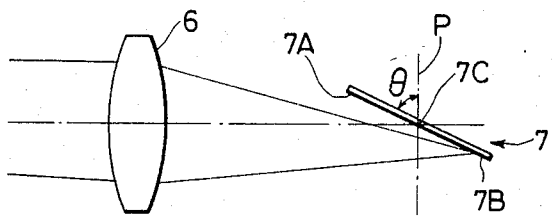
FIGS. 6A, 6B and 6C show the relations between the reflected light from an object and the light-receiving element in the present invention.
Figure 6B:
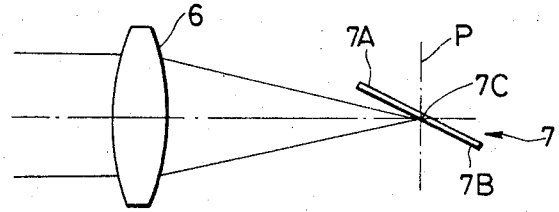
Figure 6C:
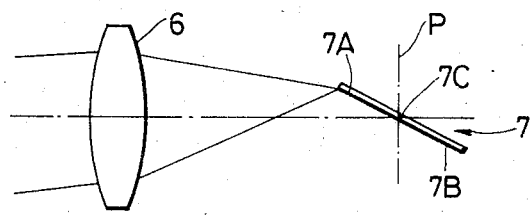

In an embodiment of the present invention shown in FIGS. 6A, 6B and 6C, portions not shown there are similar to those of the device shown in FIGS. 1 and 2, and portions similar to those of the aforedescribed example are given similar reference characters. In FIGS. 6A, 6B and 6C, P desingates a plane conjugate with respect to the image pick-up plane F (see FIG. 2), and the light from a light source 1 reflected by an object is converged on this plane P when an objective lens 5 is in focus. That is, this plane P is conjugate with the object surface when the objective lens 5 is in focus. In the present embodiment, a light-receiving element 7 is inclined by an angle θ with respect to the plane P in a direction in which the energy of the received light during non-in-focus increases, with the boundary 7C between light-receiving areas 7A and 7B as the center. That is, the light-receiving element 7 is designed so that the light-receiving surface thereof is positioned at the converged position of the reflected light during the rear focus of FIG. 6A, during the in-focus of FIG. 6B and during the front focus of FIG. 6C. The boundary 7C of the light-receiving element 7 is coincident with the converged position of the reflected light during the in-focus of the objective lens 5.

Figure 7A:
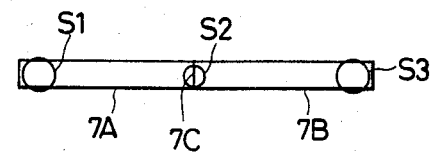
FIGS. 7A and 7B show the distribution and intensity of the reflected light in the present invention.
Figure 7B:
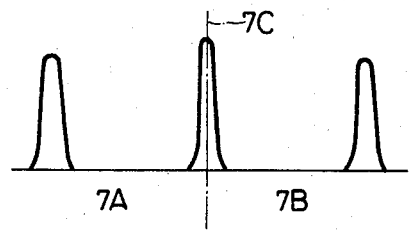
Figure 8A:
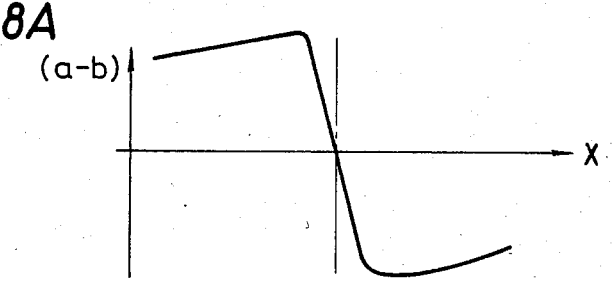
FIGS. 8A and 8B show the waveforms of the difference signal and the sum signal based on the output of the light-receiving element in the present invention.
Figure 8B:
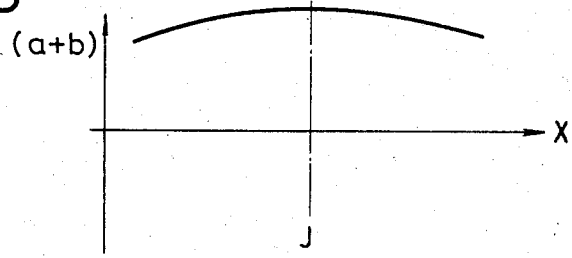

If the light-receiving surface of the light-receiving element 7 is inclined with respect to the plane P, the distribution of the light from the light source 1 reflected by the object on the light-receiving surface will be such as shown in FIG. 7A and thus, not only the distribution S2 during in-focus but also almost all of the distributions S1 and S3 during non-in-focus will enter the light-receiving surface of the light-receiving element 7. Accordingly, the light-receiving efficiency is greatly improved and the intensities of the distributions S1 and S3 of the reflected light during non-in-focus increase to substantially the same degree as during in-focus as shown in FIG. 7B. Accordingly, a difference signal (a−b) and a sum signal (a+b) formed on the basis of the outputs of the light-receiving areas 7A and 7B of the light-receiving element 7 are such as shown in FIGS. 8A and 8B, respectively, and the in-focus sensitivity thereof is improved $1/\cos\theta$ times as compared with the example of the prior art.

According to the present invention, as described above, the energy of the light received by the light-receiving element can be increased irrespective of the focus state of the objective lens and therefore, the range in which in-focus detection is possible can be enlarged and the detection capability of the device of this type can be enhanced.

What is I claim:

1. A focus detecting device for detecting a focus state of an objective lens, comprising:

sensor means provided near a plane conjugate with respect to a predetermined imaging plane of the objective lens for sensing light from a light source reflected by an object; and detection light receiving optical system for introducing the light through the objective lens to said sensor means;

said sensor means being inclined with respect to said conjugate plane, an optical axis of said detection light receiving optical system being offset from an optical axis of the objective lens, said sensor means having a first and a second light-receiving area with said optical axis of said detection light-receiving optical system as the boundary, and said first and second light-receiving areas putting out electrical signals corresponding to the incident light independently of each other.

2. A focus detecting device according to claim 1, wherein said sensor is inclined in a direction in which the energy of received light during the non-in-focus of the objective lens increases.

3. A focus detecting device according to claim 2, wherein the center of said sensor lies on said conjugate plane.

4. A focus detecting device according to claim 1, wherein said sensor is disposed so that a light-receiving surface thereof lies at a position whereat the reflected light from the object is converged.

* * * * *